United States Patent [19]

Ekelund et al.

[11] Patent Number: 4,695,413
[45] Date of Patent: Sep. 22, 1987

[54] PROTECTIVE CIRCUIT FOR A HACKER TYPE DC CONVERTER

[75] Inventors: Folke J. B. Ekelund, Norsborg; Per O. Lilja, Västerhaninge; Roland J. E. Wald, Skärholmen; Matts F. Stahl, Älvsjö, all of Sweden

[73] Assignee: Telefonaktiebolaget LM Ericsson, Stockholm, Sweden

[21] Appl. No.: 884,290

[22] PCT Filed: Nov. 18, 1985

[86] PCT No.: PCT/SE85/00461
§ 371 Date: Jun. 30, 1986
§ 102(e) Date: Jun. 30, 1986

[87] PCT Pub. No.: WO86/03349
PCT Pub. Date: Jun. 5, 1986

[30] Foreign Application Priority Data
Nov. 19, 1985 [SE] Sweden ................... 8405816

[51] Int. Cl.⁴ .................................. H02H 7/10
[52] U.S. Cl. ............................... 361/18; 323/222
[58] Field of Search ............... 361/18, 88, 91, 93; 323/222

[56] References Cited

U.S. PATENT DOCUMENTS

| | | | |
|---|---|---|---|
| 3,265,956 | 8/1966 | Schlabach | 361/18 X |
| 4,131,843 | 12/1978 | Koyama et al. | 361/18 X |
| 4,346,431 | 8/1982 | Steigerwald | 323/222 X |
| 4,363,067 | 12/1982 | Kadomski | 361/88 X |
| 4,566,051 | 1/1986 | Komulainen | 361/18 X |

FOREIGN PATENT DOCUMENTS

| | | | |
|---|---|---|---|
| 3340395 | 5/1984 | Fed. Rep. of Germany | 323/222 |
| 74817 | 6/1977 | Japan | 323/222 |
| 909667 | 2/1982 | U.S.S.R. | 323/222 |
| 922689 | 4/1982 | U.S.S.R. | 323/222 |

Primary Examiner—A. D. Pellinen
Assistant Examiner—A. Jonathan Wysocki
Attorney, Agent, or Firm—Roberts, Spiecens & Cohen

[57] ABSTRACT

A hacker type D.C. converter circuit having protective circuit features. The converter circuit includes a supply voltage source, and a series circuit including a first coil, a first diode and a first capacitor. The series circuit is connected to the supply voltage source. In addition, there is included a controllable switching arrangement, a connection junction between the first coil and first diode, and a further diode coupling across the switching arrangement. The first capacitor includes a first terminal remote from said further diode and a second terminal proximate the further diode. The connection junction is connected to the first terminal of the first capacitor remote from the further diode across the controllable switching arrangement which periodically alternates between open and closed states. The series between the connection junction and the first diode further includes an inductor and a second coil which is inductively connected to the first coil. A second diode is connected in a parallel circuit from the connection junction mentioned above and across the first diode of the first capacitor.

7 Claims, 2 Drawing Figures

PROTECTIVE CIRCUIT FOR A HACKER TYPE DC CONVERTER

FIELD OF INVENTION

The invention relates to a protective circuit for a hacker type D.C. converter in which a series circuit including a coil, a diode and a capacitor is connected to the poles of a supply voltage source, and in which a connection point between the coil and the diode is connected to the end of the capacitor facing away from the diode via a controllable switching element which is adapted for periodically changing between open and closed states.

BACKGROUND

A converter of the kind mention above is illustrated, for example, in German Pat. No. DE 2,644,715 in FIG. 25. Large power losses occur in such a converter, particularly when converting high voltages and at high power take-off. The losses occur particularly in the diode, through which a reverse current occurs each time the switching element closes. Losses in the double also occur when it is in on-state condition in the forward direction. These so-called on-state losses dominate at comparatively low switching frequencies for example at the supply frequency (50-60 Hz). On the other hand, the switching-off losses of the diode dominate when hacking at high frequency, e.g. 20 kHz, particularly in conjunction with high voltages, e.g. 400 volts, and high current strengths. Apart from the disadvantages which the losses intrinsically are, they also result, together with the heavy voltage and current variations occurring in the converter, in that the diode and switch are subjected to large stresses and are easily damaged. The current variations also give rise to radio interference, which can disturb the apparatus in which the converter is included and other apparatus as well.

The known converter according to the above has been provided with a protective circuit for decreasing the power losses and high voltages at the switch. However, it has been found difficult to get a circuit of this kind to function satisfactorily. Furthermore, the losses are increased due to energy that has been preciously stored in coils capacitors, being subsequently consumed in resistors.

SUMMARY OF INVENTION

An object of the present invention is to provide a protective circuit for D.C. converter of the kind mentioned above, with the aid of which power losses as well as rapid voltage and current variations can be reduced considerably. This is achieved in principle by two suitably selected inductive elements being inserted in series with the diode, and in that a second diode is connected in parallel with these inductive elements and the diode.

To achieve the above and other objects of the invention, there is provided a hacker type D.C. converter circuit having protective circuit features. The converter circuit comprises a supply voltage source, and a series circuit including a first coil, a first diode and a first capacitor. The series circuit is connected to the supply voltage source.

In addition, there is included a controllable switching arrangement, a connection junction between the first coil and first diode, and a further diode coupling across the switching arrangement.

The first capacitor includes a first terminal remote from said further diode and a second terminal proximate the further diode. The connection junction is connected to the first terminal of the first capacitor remote from the further diode across the controllable switching arrangement which periodically alternates between open and closed states.

The series between the connection junction and the first diode further includes an inductor and a second coil which is inductively connected to the first coil. A second diode is connected in a parallel circuit from the connection junction mentioned above and across the first diode of the first capacitor.

Other features of the invention include that a resistor is connected in the above-mentioned parallel circuit in series with the second diode and that the first diode has a lower threshhold voltage than the second diode. Another feature is that the first capacitor is connected in parallel with a second capacitor which from an impedance aspect is a shorter distance to the second diode than does the first capacitor. In accordance with a still further feature, there is provided a third capacitor, a resistor and a third diode, the third capacitor being connected in series with the latter said resistor across which the third diode is connected in parallel. The switching arrangement is in parallel with the serially-connected third capacitor and resistor.

Other features will be found in the Detailed Description which follows hereinbelow.

BRIEF DESCRIPTION OF DRAWING

The invention will next be described in detail with reference to the accompanying drawing in which.

DETAILED DESCRIPTION

Figure 1:
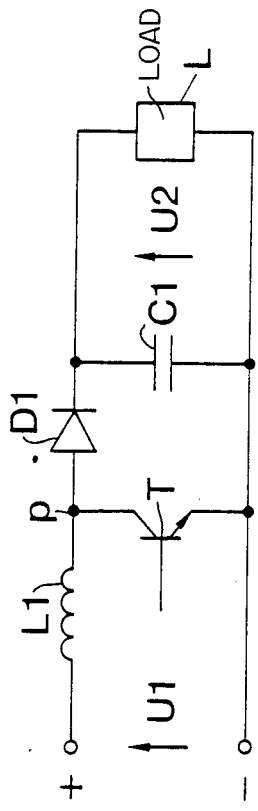
FIG. 1 illustrates a known D.C. voltage converter.

A known D.C. converter of the hacker type is illustrated in FIG. 1. In this known converter, a coil L1, a diode D1 and a capacitor C1 are connected in series to the poles of a supply voltage source U1. A load L is connected in parallel with the capacitor. A connection point p between the coil and diode is connected to the negative pole of the voltage source via a controllable switching element T in the form of a transistor. If the transistor is controlled to be alternatingly on-state and off-state, the voltage U2 across the capacitor and load will be higher than the supply voltage U1, and then the converter functions as a voltage increasing circuit.

Since the capacitor C1 will be positively charged on its side facing towards the diode D1, the diode will be biassed in the reverse direction each time the transistor T becomes on-state. Before the diode blocks in the reverse direction, a charge stored during its on-state in the forward direction gives rise to a reverse current during the diode recovery time. The reverse current involves a power loss, which will be considerable for hacking at high frequency, particularly in converting high voltages and at high power take-offs. As will be seen from the above, the power losses and the heavy voltage and current variations cause the diode and transistor to be subjected to large stresses and the occurrence of radio interference.

Figure 2:
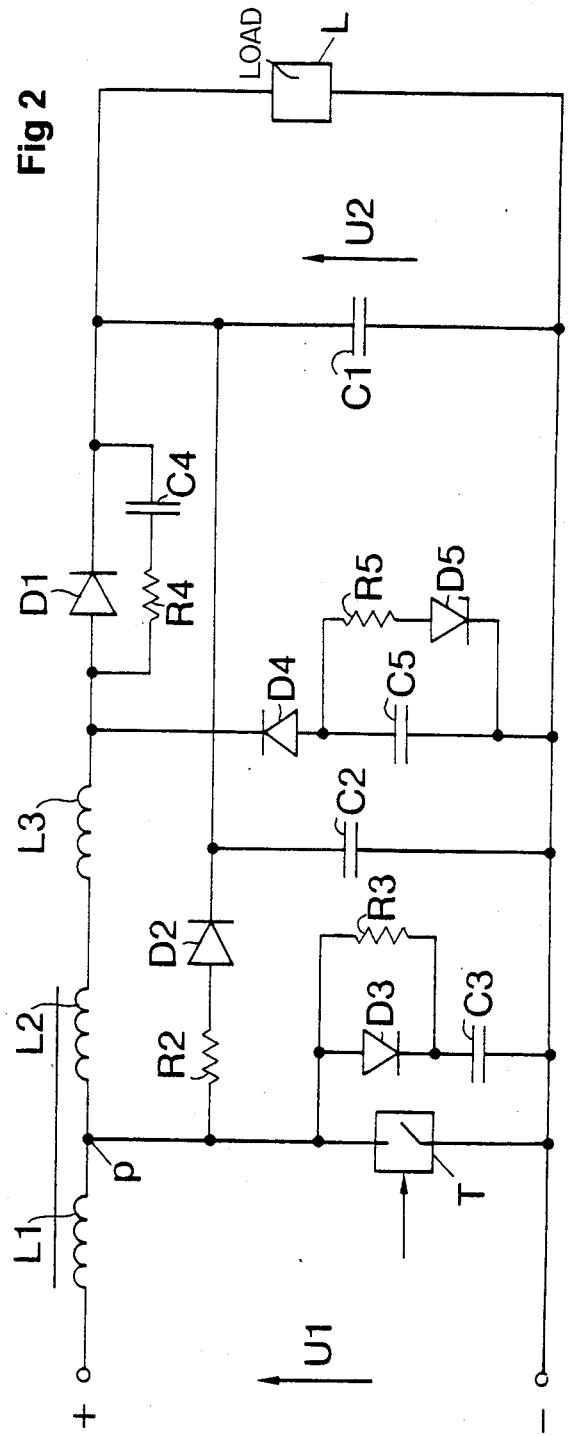
FIG. 2 illustrates a D.C. converter with a protective circuit provided in accordance with the invention.

An embodiment of a D.C. converter with a protective circuit provided in accordance with the invention is illustrated in FIG. 2 in which the coil L1, diode D1, capacitor C1 and load L have their counterparts in FIG. 1. The switching element T may comprise a transistor, as with the known converter according to FIG. 1. Two further coils L2 and L3, of which the coil L2 is inductively connected to the coil L1, are in series with the coil L1 and the diode D1 inserted between the point p and the diode anode. The coil L3 can either consist of an optionally selected inductive element with suitable inductance, or it may be achieved in effect with the aid of the leakage field from the coil L2. All three coils may be provided by a single coil in practice.

Since the current through a coil has the tendency of only changing comparatively slowly, there is obtained, due to the coil L3, a considerably weaker and shorter duration reverse current through the diode D1 when the switch T is switched on than in conventional converters of this kind. This gives a lower power loss in the diode and simultaneously a milder current shock through the switch.

A diode denoted D2 is in series with a resistor R2 and connects the point p to the capacitor C1. The task of the diode is to be a path for the current from the coil L1 directly after the switch TT is switched off. At the beginning of each switch-off period namely the coil L3 namely prevents the current from the coil L1 from going through the diode D1. The current path R2-D2 also limits the growth of the voltage across the switch on switching off, as this voltage could otherwise damage the switch. To limit this voltage, the switch is also connected in parallel, in a manner known per se, with a circuit consisting of a capacitor C3 in series with a resistor R3, accross which a diode D3 is connected.

When the switch T is switched off, the current flows first for a short time through the circuit connected in parallel with the switch, the capacitor C3 then being charged. When the current through this circuit decreases, it increases through the resistor R2 and diode D2. Finally, the current increases through the diode D1, which is accelerated by an e.m.f. occurring in the coil L2 and generated due to the inductive coupling between the coils L1 and L2. By suitable mutual adjustment of the components, the current is transferred entirely from the branch R2-D2 to the branch L2-L3-D1, whereafter it is also retained in this branch. This depends above all on that the e.m.f. in the coil L2, at least to a certain extent, can be caused to occur during the whole time the switch is off. The transfer and retention is further facilitated by the resistance of the resistor R2, and if the diode D1 has a lower threshold voltage than the diode D2. The resistor R2 may possibly be excluded. However, it is essential that the current through the diode D2 ceases before the switch T is closed again, since a reversed current would otherwise occur in this diode.

The capacitor C1 suitably is an electrolyte capacitor with relatively high capacitance. A smaller capacitor C2 is connected in parallel with it, but closer to the diode D2 than where the capacitor C1 is situated, from the point of view of impedance. The task of this smaller capacitor is to be a low-impedance path for high-frequency currents from the branch R2-D2, although it is conceivable to exclude this capacitor.

When the switch T is switched on, there may be a higher voltage across the diode D1 than across the capacitor C1, due to that the potential at the diode anode can be lower than the potential at the negative pole of the supply voltage source U1. This high voltage is reduced by an RC link connected across the diode and consisting of a resistor R4 in series with a capacitor C4. The voltage is also reduced by an attenuation circuit between the diode D1 anode and the negative supply pole. This circuit comprises a diode D4 in series with a capacitor C5, which is connected in parallel with a resistor R5 in series with a Zener diode D5. When the potential at the diode D1 anode becomes lower than the potential at the negative pole of the supply voltage source, the diode D4 assumes its on-state and the capacitor C5 is charged. The voltage across the diode D1 is thus substantially limited to the sum of the voltages across the capacitors C1 and C5. The voltage across the capacitor C5 is determined by the Zener voltage of the diode D5, and with suitable values for this and the resistance of the resistor R5 the losses in these components can be limited to modest values.

By way of summary it may be said that the losses and stresses in the diode D1 and switching element T may be substantially limited by the circuits shown, while high-frequency interference fields are heavily reduced.

Examples of component values for a functioning circuit will be seen from the list below.

L1: 1 mH  R2: 0.1 ohms  R5: 10 ohms  C3: 1 nF
L2: 10 $\mu$H  R3: 100 ohms  C1: 5,000 $\mu$F  C4: 1 nF
L3: 10 $\mu$H  R4: 100 ohms  C2: 1 $\mu$F  C5: 0.1 $\mu$F
D5 Zener voltage: 50 V

We claim:

1. A hacker type D.C. converter circuit comprising a supply voltage source, a series circuit including a first coil (L1), a first diode (D1) and a first capacitor (C1), said series circuit being connected to the supply voltage source (U1), controllable switching means, a connection junction between said first coil and first diode, a further diode (D3) and capacitor (C3) coupled across said switching means, said first capacitor including a first terminal remote from said further diode and a second terminal proximate said further diode and an impedance means, said connection junction (p) between the first coil (L1) and the first diode (D1) being connected to the first terminal of the first capacitor (C1) remote from the further diode through said impedance means across said controllable switching means (T), which periodically alternates between open and closed states, the series circuit between said connection junction (p) and the first diode (D1) further including an inductive element (L3) and a second coil (L2) which is inductively connected to the first coil (L1), and a second diode (D2) connected in a parallel circuit from the connection junction (p) and across the first diode (D1) to the first capacitor.

2. A circuit as claimed in claim 1, comprising a resistor (R2) connected in said parallel circuit in series with the second diode (D2).

3. A circuit as claimed in claim 1 or 2, wherein the diode (D1) has a lower threshold voltage than said second diode (D2).

4. A circuit as claimed in claim 1, comprising a second capacitor (C2), the first capacitor (C1) being connected in parallel with said second capacitor (C2).

5. A circuit as claimed in claim 4, comprising a third capacitor, a resistor (R3), and a third diode (D3), said third capacitor (C3) being connected in series with said resistor (R3) across which said third diode (D3) is connected in parallel, said switching means (T) being in parallel with the serially connected third capacitor and resistor.

6. A circuit as claimed in claim 5, comprising an RC link comprising a fourth capacitor (C4) and a further resistor (R4) in series with ssaid fourth capacitor (C4), said RC link being connected in parallel with the first diode (D1).

7. A circuit as claimed in claim 6, including a further circuit comprising a fourth diode (D4) in series with two branches connected in parallel, of which one branch is a fifth capacitor (C5) and the other branch an additional resistor (R5) in series with a Zener diode (D5), said further circuit being connected between the first diode (D1) and the first capacitor (C1).

* * * * *